Patented Nov. 7, 1950

2,528,789

UNITED STATES PATENT OFFICE 2,528,789

PRODUCTION OF BENZOPHENONE

Alexander N. Sachanen, Woodbury, and Philip D. Caesar, Wenonah, N. J., assignors to Socony-Vacuum Oil Company, Incorporated, a corporation of New York No Drawing. Application March 1, 1946, Serial No. 651,428

2 Claims. (Cl. 260—591)

This invention relates to the synthesis of aromatic compounds of the type which may be produced by a Friedel-Crafts reaction, and is more particularly concerned with a process for producing benzophenone.

As is well known to those familiar with the art, the Friedel-Crafts synthesis is one of the classical reactions of organic chemistry, and therefore, it is well understood in the art. In accordance with the Friedel-Crafts synthesis, when aromatic hydrocarbons and most of their substituted derivatives except the nitro compounds, are contacted with a halogen derivative of an organic compound, in the presence of aluminum chloride or an equivalent metallic halide catalyst and under suitable reaction conditions, the aromatic hydrocarbons and most of their substituted derivatives lose a hydrogen atom from the nucleus while the halogen derivative of an organic compound loses a halogen atom, and the two radicals condense to yield condensation products. Accordingly, the Friedel-Crafts synthesis is a convenient way for preparing alkyl aromatic compounds, aromatic ketones, etc. The type of condensation effected by a Friedel-Crafts synthesis is exemplified, as is well known, by the following equation, wherein R represents an aromatic radical, R' represents an organic radical, and X represents a halogen atom:

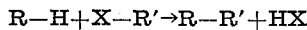

More specifically, using the Friedel-Crafts synthesis, benzene may be condensed with a benzoyl halide to produce benzophenone:

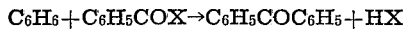

Although the Friedel-Crafts synthesis provides an effective and direct means for obtaining valuable organic compounds, benzophenone, for example, the compounds thus obtained are relatively expensive in view of the cost of the metallic halide catalysts and the expense involved in separating the catalysts from the reaction products. As a result, considerable investigation has been carried out in an effort to develop synthesis whereby the desired condensations are effected in the absence of catalysts.

For example, Nenitzescu et al. [Annalen der Chemie, 491, 210–220 (1931)] have found that the more reactive aromatic compounds can be condensed directly with a halogen derivative of an organic compound in the absence of a catalyst. Specifically, they have reported that in the absence of catalysts, alkyl benzenes can be condensed with benzyl chloride, that diphenyl, naphthalene and anthracene can be condensed with benzyl chloride, and that diphenyl and naphthalene can be condensed with benzoyl chloride. However, these investigators have reported also that in the absence of catalysts, and even through the use of high temperatures, 1112–1202° F., that benzene cannot be alkylated with alkyl halides, that benzene cannot be condensed with benzoyl chloride, and finally, that benzene cannot be condensed with benzyl chloride. They reported the foregoing as follows: "In the case of benzene itself, it was not possible to obtain a condensation with simple alkyl halides such as ethyl bromide, propyl chloride and benzyl chloride. . . . With benzene, however, the benzoyl chloride condenses just as little as the above-mentioned alkyl halides."

We have discovered that it is possible to condense benzene with a benzoyl halide in the absence of a catalyst.

We have now found that under appropriate conditions of temperature and reaction time, that benzene can be condensed with a benzoyl halide in the absence of a catalyst.

Accordingly, it is an object of the present invention to provide a process for effecting the condensation of benzene with a benzoyl halide. Another object is to provide a non-catalytic or thermal process for producing benzophenone. A more specific object is to afford a process for effecting the condensation of benzene with a benzoyl halide in the absence of a catalyst. A very important object is to provide an efficient and relatively cheap process for producing benzophenone. Other objects and advantages of the present invention will become apparent to those skilled in the art from the following description.

Broadly stated, the present invention provides a process for effecting the condensation of benzene with a benzoyl halide in the absence of a catalyst, which comprises contacting benzene with a benzoyl halide under certain related conditions of temperature and reaction time.

The reaction conditions necessary for effecting the synthesis contemplated herein include temperatures varying between about 300° F. and about 800° F., preferably, temperatures varying between about 400° F. and about 700° F., and reaction times varying between several hours at temperatures approximating the lower limit of the temperature range and about one minute at temperatures approximating the upper limit of the temperature range. Accordingly, it must be clearly understood that in view of the interdependence of these reaction variables, when one is arbitrarily fixed, the range of variation of the other is somewhat more restricted. In any particular instance, for example, at a given temperature, the most desirable reaction time can be readily ascertained by one skilled in the art, the working ranges of both the temperature and time of reaction having been indicated hereinbefore.

The interdependence of the temperature of reaction and reaction time is illustrated by the following tests which were carried out in a 2.8-liter, high-pressure, stainless steel, rocker bomb. The charge in each case consisted of 468 grams of benzene (6 moles) and 285 grams of benzoyl chloride (2 moles).

| Run No. | Approximate Pressure, Pounds per Square Inch | Reaction Temperature, °F. | Reaction Time, Minutes | Recovered Benzoyl Chloride, Grams | Benzophenone Yield | |
|---|---|---|---|---|---|---|
| | | | | | Grams | Per Cent of Theoretical |
| 1 | 2,000 | 495–500 | 5 | 119 | 153 | 42 |
| 2 | 1,700 | 430–440 | 60 | 102 | 160 | 44 |
| 3 | 2,000 | 500–515 | 60 | 42 | 207 | 57 |
| 4 | 2,500 | 650–660 | 60 | 0 | 190 | 52 |
| 5 | 2,000 | 480–505 | 180 | 0 | 276 | 76 |

The pressure to be used in the process of our invention may vary between wide limits. In this connection, it must be noted that Nenitzescu et al. (supra) attempted to condense benzene with benzoyl chloride at elevated temperatures and at atmospheric pressure. As a result, the reaction time of their attempted synthesis must have been of the order of a fraction of a second. For example, at atmospheric pressure and a temperature of 523° F., and using a charge of one mole of each reactant, it would require approximately 90 liters of reaction tube space to achieve a reaction time of one hour. Therefore, if a continuous successful reaction is to be realized using a reaction tube of reasonable length, in order to attain a reaction time of required magnitude, the pressure must be sufficient to ensure a high density of reactants.

The following tests illustrate the foregoing, i. e., increased pressure does not increase the yield of benzophenone and that lowering the pressure renders the desired synthesis impractical from the standpoint of reaction vessel size. These tests were carried out in a 2.8-liter, high-pressure, stainless steel, rocker bomb.

| Run No. | Charge | | Reaction Time, Minutes | Reaction Temperature, °F. | Pressure, Pounds Per Square Inch | Benzophenone Yield | |
|---|---|---|---|---|---|---|---|
| | Benzene, Grams | Benzoyl Chloride, Grams | | | | Grams | Per Cent of Theoretical |
| 6 | 468 | 285 | 60 | 510 | 2,000 | 207 | 68 |
| 7 | 240 | 140 | 60 | 510 | 900 | 125 | 70 |
| 8 | 60 | 35 | 60 | 510 | 200 | 35 | 70 |

Following the trend established by the results of runs Nos. 6, 7 and 8, it would require a total charge of only 6 grams if the pressure were to be reduced to atmospheric. This, of course, would be utterly impractical from a commercial standpoint.

Therefore, the pressure to be employed in a continuous reactor of given size depends upon the time of reaction to be used, which in turn depends upon, as stated hereinbefore, the temperature of reaction. Hence, it will be appreciated that the reaction embodied in the process of the present invention will be fully defined by a recitation of the temperature range, and of the time of reaction range or of the pressure range. Thus, when operating with continuous reaction vessels of practical size, using a practical "on-stream" reaction time for the temperature employed, the pressure must be such as to ensure the aforesaid practical "on-stream" reaction time. Accordingly, we have found that under these conditions the pressure should be at least about 200 pounds per square inch, and preferably, at least about 1000 pounds per square inch. Obviously, there can be no real upper limit to the pressure range other than one dictated by commercial feasibility. Stated differently, the temperature employed may be sufficiently close to the lower limit of the working range as to require a reaction time of several hours to achieve practical yields of benzophenone. In view of the foregoing, it follows that a very high pressure would be required to attain such a reaction time in a reaction vessel of conventional design.

In general, any benzoyl halide may be utilized. For reasons of economy, however, we prefer to use benzoyl chloride. The benzoyl halide reactant may constitute as little as 2 mol per cent or as much as 98 mol per cent of the charge. In practice, however, we use charges containing an excess, on a mol per cent basis, of the benzene reactant over the benzoyl halide reactant, and preferably, charges containing benzene in amounts varying between about 50 mole per cent and about 90 mole per cent.

The process of our invention may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the reactants be intimately contacted with each other. This may be effected in several ways and in apparata which are well known in the art.

The following detailed example is submitted for the purpose of illustrating a mode of carrying out the process of our invention. It is to be understood that the invention is not to be considered as limited to the specific mode or conditions of operation set forth therein. As it will be apparent to those skilled in the art other benzoyl halides and a wide variety of other operating conditions within the ranges indicated hereinbefore may be utilized.

Example 468 grams of benzene (6 moles) and 285 grams of benzoyl chloride (2 moles) were placed in a 2.8-liter, high-pressure, stainless steel, rocker bomb. The temperature was raised to 500–515° F. and the contents of the bomb were kept at this temperature for one hour. The pressure during the reaction was approximately 2000 pounds per square inch. The bomb was then cooled and the contents were removed and subjected to distillation. 207 grams of benzophenone were obtained and 42 grams of benzoyl chloride were recovered.

The synthesis contemplated herein and illustrated in the foregoing, is clearly superior to the customary Friedel-Crafts synthesis in that no metal halide catalyst is required, and inasmuch as the desired benzophenone can be separated easily from the reaction mixture by distillation since no metallic halide catalyst is present. It will be apparent, therefore, that the present invention provides an efficient and relatively inexpensive process for producing benzophenone. Benzophenone is useful as an intermediate in various organic syntheses.

This application is a continuation-in-part of copending application Serial Number 480,372, filed March 24, 1943, now abandoned.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. A process for the production of benzophenone, which comprises contacting benzene with a benzoyl halide, in the absence of a catalyst, at a temperature falling within the range varying between 400° F. and 700° F., for a period of time varying between about three hours and about five minutes, the lower times being used with the higher temperatures and the higher times being used with the lower temperatures, and at pressures in excess of 200 pounds per square inch, whereby the yields of benzophenone are at least about 40 per cent of the theoretical.

2. A process for the production of benzophenone, which comprises contacting benzene with benzoyl chloride, in the absence of a catalyst, at a temperature falling within the range varying between 400° F. and 700° F., for a period of time varying between about three hours and about five minutes, the lower times being used with the higher temperatures and the higher times being used with the lower temperatures, and at pressures in excess of 200 pounds per square inch, whereby the yields of benzophenone are at least about 40 per cent of the theoretical.

ALEXANDER N. SACHANEN.
PHILIP D. CAESAR.

REFERENCES CITED

The following references are of record in the file of this patent:

UNITED STATES PATENTS

| Number | Name | Date |
|---|---|---|
| 2,386,007 | Schmerling et al. | Oct. 2, 1945 |

OTHER REFERENCES

Beilstein, 4th edition, vol. VII, supplement, page 218.

Nenitzescu et al., Annalen der Chemie, vol. 491, pages 210–220 (1931).

Grucarevic et al., Berichte, vol. 6, pages 1238–1246 (1873).